United States Patent
Böck et al.

(10) Patent No.: US 8,282,524 B2
(45) Date of Patent: Oct. 9, 2012

(54) TRANSMISSION DEVICE FOR DISTRIBUTING A DRIVE TORQUE TO AT LEAST TWO OUTPUT SHAFTS

(75) Inventors: Alois Böck, Hutthurm (DE); Detlef Baasch, Friedrichshafen (DE); Gerhard Gumpoltsberger, Friedrichshafen (DE); Thomas Rosemeier, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 684 days.

(21) Appl. No.: 12/300,013

(22) PCT Filed: Apr. 16, 2007

(86) PCT No.: PCT/EP2007/053663
§ 371 (c)(1),
(2), (4) Date: Nov. 7, 2008

(87) PCT Pub. No.: WO2007/131847
PCT Pub. Date: Nov. 22, 2007

(65) Prior Publication Data
US 2009/0118051 A1    May 7, 2009

(30) Foreign Application Priority Data
May 12, 2006  (DE) .......................... 10 2006 022 173

(51) Int. Cl.
*F16H 37/08*   (2006.01)
*F16H 57/08*   (2006.01)
(52) U.S. Cl. ........................................ 475/205; 475/339
(58) Field of Classification Search .................. 475/198, 475/201, 203, 204, 205, 221, 323, 339
See application file for complete search history.

(56) References Cited

U.S. PATENT DOCUMENTS
5,415,598 A    5/1995   Sawase et al.
(Continued)

FOREIGN PATENT DOCUMENTS
DE    2 017 716    11/1970
(Continued)

OTHER PUBLICATIONS
Translation of Japanese Office Action dated May 22, 2012.

*Primary Examiner* — Roger Pang
(74) *Attorney, Agent, or Firm* — Davis & Bujold, P.L.L.C.

(57) ABSTRACT

A transmission device is proposed for distributing a drive torque to at least two output shafts (Ab1, Ab2), comprising a differential (2) that is permanently connected to the output shafts (Ab1, Ab2), wherein a double planetary gearset (4) is provided co-axially to the output (Ab2) between the differential cage (3) of the differential (2) and the output (Ab2) of one side, said planetary gearset comprising a first sun gear (5) and a second sun gear (6), a first planetary range (7), an intermediate planetary range (8), and an internal gear (9), herein the internal gear (9) is connected to the differential cage (3) and the planet carrier (10) of the planetary gearset (4) is connected to the output (Ab2), wherein the first sun gear (5) meshes with the first planetary range (7) and can be coupled to the housing (G) by means of a brake (11) in order to shift the torque in one direction, and wherein the second sun gear (6) meshes with the intermediate planetary range (8) and can be coupled to the housing (G) by means of an additional brake (19) in order to shift the torque in the opposite direction.

3 Claims, 1 Drawing Sheet

U.S. PATENT DOCUMENTS

| | | | |
|---|---|---|---|
| 6,056,660 A * | 5/2000 | Mimura | 475/205 |
| 7,044,880 B2 | 5/2006 | Bowen | |
| 2005/0261099 A1 | 11/2005 | Bowen | |
| 2005/0266950 A1 | 12/2005 | Bowen | |
| 2006/0079370 A1 * | 4/2006 | Kushino | 475/221 |
| 2006/0225982 A1 | 10/2006 | Baasch et al. | |
| 2007/0015618 A1 | 1/2007 | Baasch et al. | |
| 2008/0113842 A1 * | 5/2008 | Kinoshita et al. | 475/205 |

FOREIGN PATENT DOCUMENTS

| | | |
|---|---|---|
| DE | 693 01 434 T2 | 8/1996 |
| DE | 697 10 033 T2 | 10/2002 |
| DE | 103 48 959 A1 | 5/2005 |
| DE | 103 48 960 A1 | 5/2005 |
| EP | 1 616 743 A2 | 1/2006 |
| EP | 1 621 800 A3 | 2/2006 |
| JP | 101 519 51 A | 6/1998 |
| JP | 11-165559 | 6/1999 |
| JP | 2001039179 | 2/2001 |
| JP | 2002 174 263 A | 6/2002 |
| JP | 2001 0039 179 A | 10/2002 |
| JP | 2002 319 901 A | 10/2002 |
| WO | WO-2005/116489 | 12/2005 |

* cited by examiner

TRANSMISSION DEVICE FOR DISTRIBUTING A DRIVE TORQUE TO AT LEAST TWO OUTPUT SHAFTS This application is a national stage completion of PCT/EP2007/053663 filed Apr. 16, 2007, which claims priority from German Application Serial No. 10 2006 022 173.1 filed May 12, 2006.

FIELD OF THE INVENTION

The invention relates to a transmission device for distributing a drive torque to at least two output shafts.

BACKGROUND OF THE INVENTION

Transmission devices or phase shifter gearboxes of this type are used to shift torque between the wheels of an axle in motor vehicles. To this end, in addition to the actual differential, corresponding devices or phase shifter units are provided where, for each transmission direction, a multi-disc clutch is provided.

From the Applicant's DE 103 48 959 A1, a transmission device is known for distributing drive torque to at least two output shafts and having at least two planetary gearsets with at least three shafts, where the planetary gearsets serve as differentials. Here, in each case, a shaft of a planetary gearset is connected to an input shaft, and a second shaft of a planetary gearset is connected to one of the output shafts. Furthermore, in each case, a third shaft of the planetary gearsets is functionally connected to a brake such that a degree of distribution of the drive torque, between the two output shafts, varies as a function of the transmission capacities of the brakes. DE 103 48 959 A1 additionally describes a method of controlling and regulating the known transmission device in which, to distribute a drive torque of a drive unit between the two output shafts of the transmission device, the transmission capacities of the two brakes are adjusted such that one brake has a synchronous state and the transmission capacity of the other brake is varied between a lower threshold value and an upper threshold value that corresponds to an engaged state of the brakes.

The Applicant's DE 103 48 960 A1 also describes a transmission device for distributing a drive torque to at least two output shafts having at least two planetary gearsets with at least three shafts, where the planetary gearsets serve as differentials and, in each case, a shaft of a planetary gearset is connected to a drive shaft. Furthermore, in each case, a shaft of a planetary gearset represents one of the output shafts where, in each case, at least one additional shaft of a planetary gearset has a functional connection to a shaft of an additional planetary gearset. A torque of a shaft that depends on the operating state, subject in each case to an operating state of the other shaft that is functionally connected thereto, can be supported via the functional connection such that when a difference in the rotational speeds between the output shafts occurs, a torque that changes the rotational speed difference is applied to the planetary gearsets by way of the functional connection.

The German published patent application 2 017 716 describes a steering gear for tracked vehicles, in particular for snow cats, comprising a drive pinion, a ring gear that meshes therewith and is fixedly connected to an inner transmission housing, as well as compensating gears rotatably supported inside the housing and at least two output shafts. A second differential gear is thereby superimposed on this known differential gear, where one or the other side of the superimposed differential can be completely or partially immobilized.

In addition, a differential gear is known from DE 697 10 033 T2, comprising a rotatable component on the input side for receiving an external drive force, two rotatable components on the output side that are arranged co-axially to the axis of rotation of the rotatable component on the input side; a transmission housing in which the input-side component and the output-side components are supported in a freely rotatable manner, where a torsional force of the input-side rotatable component is transmitted to the output-side rotatable component, while a different rotational speed is allowed between the output-side rotatable components.

In addition, this differential gear comprises a first input-side, gearwheel that is provided on the input-side, rotatable component at an axial end thereof, the component being rotatable together with the input-side, rotatable component; a second input-side, gear wheel that is provided on the input-side, rotatable component and can be rotated together therewith; a first output-side, gear wheel having a deceleration ratio that is greater or smaller in relation to the first input-side, gear wheel, where the first output-side, gear wheel can be rotated together with the output-side, rotatable components; a second output-side, gear wheel having a deceleration ratio that is smaller or greater in relation to the second input-side gear wheel; at least one planetary gear that meshes with the first input-side, gear wheel and the first output-side, gear wheel and at least one second planetary gear that meshes with the second input-side, gearwheel and the second output-side, gear wheel.

In the transmission according to DE 697 10 033 T2, the second input-side, gear wheel is arranged on the input-side, rotatable component at an axial end thereof where the second output-side, gear wheel can be co-axially rotated with one of the output-side, rotatable components. In addition, the differential gear comprises a carrier that supports the first planetary gear and the second planetary gear, such that they can rotate around their own axes and rotate around the axis of rotation of the input-side, rotatable component.

In addition, a first rotation control is provided for controlling the rotation of the carrier about the axis of rotation of the input-side, rotatable component with arbitrary control force and a second rotation control for controlling the rotation of the second output-side, gear wheel with arbitrary control force, where the rotation controls comprise a plurality of friction plates, which can be rotated together with the carrier or the second output-side, gear wheel, as well as a plurality of friction plates that can be rotated together with the housing. Furthermore, pressure media are provided for compressing the friction plates with an arbitrary compressive force. This known transmission disadvantageously comprises a large number of components and the manufacturing and installation costs are high.

The present invention is based on the aim of providing a transmission device for distributing a drive torque to at least two output shafts, comprising a differential that has a simple design. In particular, the phase shifter unit shall be integrated into a differential, where the actuation of the phase shifter unit on one side of the differential shall be enabled.

SUMMARY OF THE INVENTION

A transmission device for distributing drive torque to at least two output shafts is proposed, comprising a differential that is permanently connected to the output shafts where, between the differential cage and the output of one side, an actuation device is provided, by way of which the torque can be transmitted in both directions.

A first embodiment of the invention provides for a double planetary gearset to be arranged co-axially to the output between the differential cage of the differential and the output of one side. The planetary gearset comprises a first sun gear, a second sun gear, a first planetary gear, a second planetary gear and a ring gear, where the ring gear is connected to the differential cage and the planet carrier of the planetary gearset is connected to the output. The first sun gear meshes with the first planetary gear and can be braked or coupled in a controlled manner by way of a brake to a housing of the transmission device in order to shift the torque in one direction. The second sun gear of the planetary gearset meshes with the second planetary gear and can be braked or coupled in a controlled manner to a housing of the transmission device in order to shift the torque in the opposite direction.

In a second advantageous embodiment of the invention, controlled actuation by way of a shiftable gear ratio is replaced with a plus planetary gearset, where actuation takes place via a brake on the planet carrier of a plus planetary gearset.

To this end, between the differential cage of the differential and the output of one side, viewed in the direction of power flow, two plus planetary gearsets (first planetary gearset, second planetary gearset) are arranged one after the other, co-axially to the output, where the first planetary gearset comprises a first sun gear, a second sun gear, a first planetary gear and a second planetary gear and the second planetary gearset comprises a first sun gear, a second sun gear, a first planetary gear, and a second planetary gear, where the first sun gear of the first planetary gearset is connected to the differential cage and the second sun gear of the first planetary gearset is connected to the first sun gear of the second planetary gearset.

In addition, the second sun gear of the second planetary gearset is connected to the output, where the planet carrier of the second planetary gearset can be braked or coupled in a controlled manner by way of a brake to a housing of the transmission in order to actuate the transmission device or to transfer a controllable torque and where the planet carrier of the first planetary gearset can be coupled, preferably by way of a claw clutch, to a housing of the transmission device in order to realize a gear ratio reversal.

Through use of the inventive conception, a very compact design is achieved using a very low number of components, which makes it possible to arrange the actuating devices of the transmission device on one side of the differential.

BRIEF DESCRIPTION OF THE DRAWINGS

The invention will now be described, by way of example, with reference to the accompanying drawings in which.

DETAILED DESCRIPTION OF THE INVENTION

Figure 1:
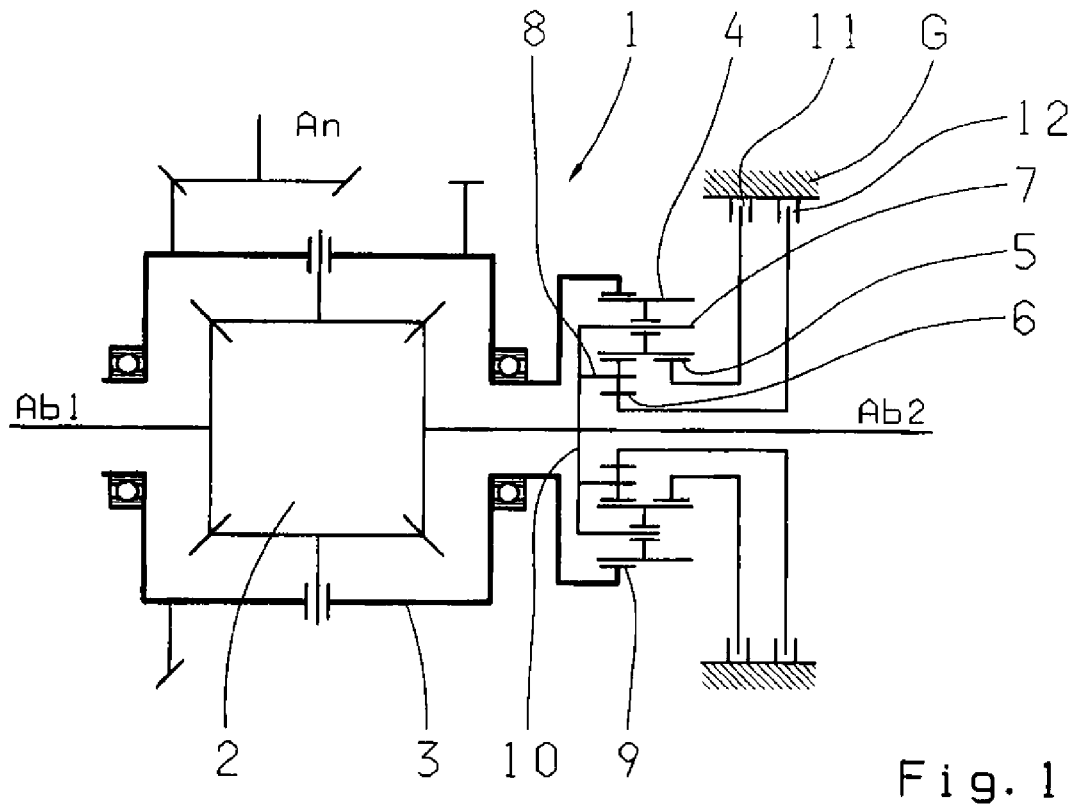
FIG. 1 is a schematic view of a first embodiment of the invention, in which a double planetary gearset is provided, between the differential cage of the differential and the output of one-side, co-axially to the output.

Referring to FIG. 1, an inventive transmission device 1 comprises a differential 2 having a differential cage 3 driven by a drive unit An, where outputs Ab1 and Ab2 are connected to the differential 2. As can be seen from the Figure, a double planetary gearset 4 is provided co-axially to the output Ab2 between the differential cage 3 and the output Ab2 of one side. The output Ab2 comprises a first sun gear 5 and a second sun gear 6, a first planetary gear 7, a second planetary gear 8 and a ring gear 9. Viewed radially, the second planetary gear 8 is arranged between the second sun gear 6 and the first planetary gear 7.

The ring gear 9 is connected to the differential cage 3, where a planet carrier 10 of the planetary gearset 4 is connected to the output Ab2. In addition, the first sun gear 5 meshes with the first planetary gear 7 and can be coupled by way of a brake 11 to a housing G for shifting in one direction (in the embodiment shown, downshift). In addition, the second sun gear 6 meshes with the second planetary range 8 and can be coupled, via a further brake 12, to the housing G for shifting in the opposite direction (in the embodiment shown, upshift).

Figure 2:
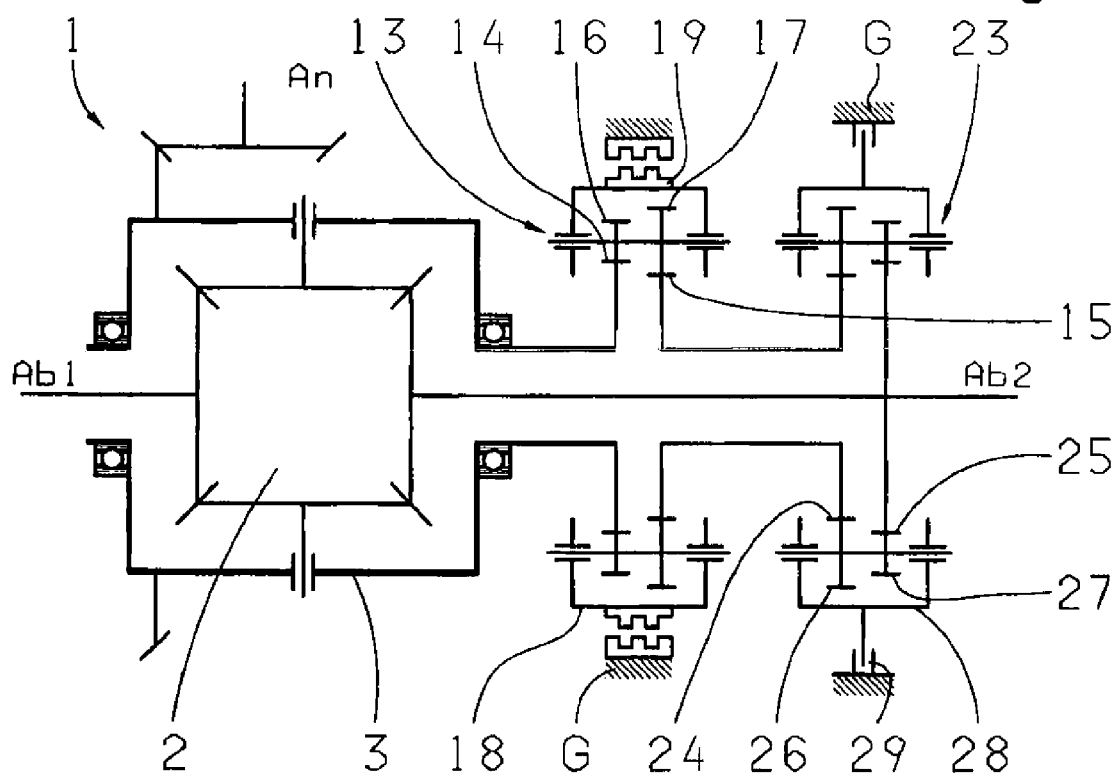
FIG. 2 is a schematic view of a second embodiment of the invention, in which, between the differential cage of the differential and the output of one side, viewed in the direction of the power flow, two plus planetary gearsets are arranged one after the other and co-axial to the output.

In the embodiment shown in FIG. 2, two plus planetary gearsets 13, 23 are arranged one after the other, viewed in the direction of the power flux, co-axially to the output Ab2 between the differential cage 3 and the output Ab2 of one side. The planetary gearset 13 comprises a first sun gear 14, a second sun gear 15, a first planetary gear 16 and a second planetary gear 17. The planetary gearset 23 comprises a first sun gear 24, a second sun gear 25, a first planetary gear 26 and a second planetary gear 27.

The first sun gear 14 of the planetary gearset 13 is connected to the differential cage 3 and is driven by the same, while the second sun gear 15 of the planetary gearset 13 is connected to the first sun gear 24 of the planetary gearset 23. Furthermore, the second sun gear 25 of the planetary gearset 23 is connected to the output Ab2. A planet carrier 28 of the planetary gearset 23 can be braked or coupled to the housing G in a controlled manner byway of a brake 29 for actuating the transmission device. In addition, a planet carrier 18 of the planetary gearset 13 can be coupled, preferably by way of a claw clutch 19, to the housing G in order to realize a gear ratio reversal.

In a preferred embodiment of the invention, the stationary gear ratio i_2 of the planetary gearset 13 is equal to the square of the stationary gear ratio i_1 of the planetary gearset 23.

Of course, any design embodiment, particularly any spatial arrangement of the components of the inventive transmission device as such or in relation to each other and to the extent it is technically reasonable, is covered by the scope of protection of the present claims, without influencing the function of the transmission device, as disclosed in the claims, even if these embodiments are not explicitly presented in the Figures or the description.

REFERENCE NUMERALS 1 transmission device
2 differential
3 differential cage
4 double planetary gearset
5 first sun gear of the planetary gearset 4
6 second sun gear of the planetary gearset 4
7 first planetary gear of the planetary gearset 4
8 second planetary gear of the planetary gearset 4
9 ring gear of the planetary gearset 4
10 planet carrier
11 brake
12 brake
13 planetary gearset
14 first sun gear of the planetary gearset 13

15 second sun gear of the planetary gearset 13
16 first planetary gear of the planetary gearset 13
17 second planetary gear of the planetary gearset 13
18 planet carrier of the planetary gearset 13
19 claw clutch
23 planetary gearset
24 first sun gear of the planetary gearset 23
25 second sun gear of the planetary gearset 23
26 first planetary gear of the planetary gearset 23
27 second planetary range of the planetary gearset 23
28 planet carrier of the planetary gearset 23
29 brake
G housing
An drive unit
Ab1 output
Ab2 output
$i\_1$ stationary gear ratio of planetary gearset 23
$i\_2$ stationary gear ratio of planetary gearset 13

The invention claimed is:

1. A transmission device, for distributing a drive torque to at least first and second output shafts (Ab1, Ab2), comprising:
   a differential (2) permanently connected to at least first and the second output shafts (Ab1, Ab2),
   first and second plus planetary gearsets (13, 23) are arranged, one after the other, co-axially with the second output shaft (Ab2), between a differential cage (3) of the differential (2) and the second output shaft (Ab2), when viewed in a direction of power flow,
   the first planetary gearset (13) comprises a first sun gear (14), a second sun gear (15), a first planetary gear (16) and a second planetary gear (17), and the second planetary gearset (23) comprises a first sun gear (24), a second sun gear (25), a first planetary gear (26) and a second planetary gear (27),
   the first sun gear (14) of the first planetary gearset (13) being continuously connected to the differential cage (3), the second sun gear (15) of the first planetary gearset (13) being continuously connected to the first sun gear (24) of the second planetary gearset (23), the second sun gear (25) of the second planetary gearset (23) being continuously connected to the second output shaft (Ab2), and a planet carrier (28) of the second planetary gearset (23) being connectable, in a controlled manner via a first brake (29), to a housing (G) for actuating the transmission device (1), and a planet carrier (18) of the first planetary gearset (13) being connectable to the housing (G) to reverse a gear ratio.

2. A transmission device, for distributing a drive torque to at least first and second output shafts (Ab1, Ab2), comprising:
   a differential (2) permanently connected to at least the first and second output shafts (Ab1, Ab2);
   first and second plus planetary gearsets (13, 23) being arranged, one after the other, co-axially with the second output shaft (Ab2), between a differential cage (3) of the differential (2) and the second output shaft (Ab2), when viewed in a direction of power flow;
   the first planetary gearset (13) comprising a first sun gear (14), a second sun gear (15), a first planetary gear (16) and a second planetary gear (17), and the second planetary gearset (23) comprising a first sun gear (24), a second sun gear (25), a first planetary gear (26) and a second planetary gear (27);
   the first sun gear (14) of the first planetary gearset (13) being connected to the differential cage (3), the second sun gear (15) of the first planetary gearset (13) being connected to the first sun gear (24) of the second planetary gearset (23), the second sun gear (25) of the second planetary gearset (23) being connected to the second output shaft (Ab2), and a planet carrier (28) of the second planetary gearset (23) being connectable, in a controlled manner via a first brake (29), to a housing (G) for actuating the transmission device (1), and a planet carrier (18) of the first planetary gearset (13) being connectable to the housing (G) to reverse a gear ratio;
   wherein the planet carrier (18) of the first planetary gearset (13) is connectable, via a claw clutch (19) to the housing (G) to reverse the gear ratio.

3. The transmission device for distributing the drive torque to at least the first and the second output shafts (Ab1, Ab2) according to claim 1, wherein a stationary gear ratio ($i\_2$) of the first planetary gearset (13) is equal to a square of a stationary gear ratio ($i\_1$) of the second planetary gearset (23).

* * * * *